United States Patent [19]
Houdou et al.

[11] Patent Number: 5,504,475
[45] Date of Patent: Apr. 2, 1996

[54] PRICING DISPLAY SYSTEM

[75] Inventors: Michel Houdou, Angers; Jacques Morineau, Tierce, both of France

[73] Assignee: Sitour Electronic Systems, Argenteuil, France

[21] Appl. No.: 185,306

[22] Filed: Jan. 19, 1994

Related U.S. Application Data

[63] Continuation of Ser. No. 92,935, Jul. 19, 1993, abandoned, which is a continuation of Ser. No. 655,159, Feb. 14, 1991, abandoned.

[30] Foreign Application Priority Data

Feb. 16, 1990 [FR] France ............................. 90 01904

[51] Int. Cl.$^6$ ........................................ H04Q 1/00
[52] U.S. Cl. ............... 340/825.35; 340/825.36; 340/825.73; 340/825.47; 455/343; 345/141
[58] Field of Search .................. 340/825.35, 825.36, 340/825.44, 825.47, 825.73, 756; 455/343, 38.3

[56] References Cited

U.S. PATENT DOCUMENTS

| | | | |
|---|---|---|---|
| 3,739,339 | 6/1973 | Hillhouse et al. | 340/825.35 |
| 4,002,886 | 1/1977 | Sundelin | 340/825.35 |
| 4,449,248 | 5/1984 | Leslie | 455/343 |
| 4,500,880 | 2/1985 | Gomersall et al. | 340/825.35 |
| 4,523,332 | 6/1985 | Mori | 340/825.44 |
| 4,821,291 | 4/1989 | Stevens et al. | 340/825.73 |
| 4,857,917 | 8/1989 | Sato | 455/343 |
| 4,996,526 | 2/1991 | Deluca | 455/343 |
| 5,089,813 | 2/1992 | Deluca et al. | 455/343 |
| 5,111,196 | 5/1992 | Hunt | 340/825.35 |

OTHER PUBLICATIONS

"Modern Digital and Analog Communications Systems" B. P. Lathi 1983 pp. 180, 181, 256–261.

Primary Examiner—Brian Zimmerman
Attorney, Agent, or Firm—Blakely, Sokoloff, Taylor & Zafman

[57] ABSTRACT

A system comprises a central unit and a plurality of display modules each adapted to show on a display information received from the central unit, for example for displaying prices in a store. The central unit comprises a transmitter including a current loop fed with a low-frequency signal modulated according to the information to be transmitted and the system comprises, associated with each display module or group of display modules, a receive circuit, a receive antenna coupled electromagnetically to said current loop and a device for activating the receive circuit at predetermined periods for a limited duration. Each transmission of information by the central unit is preceded by the transmission of a reactivation signal which, when detected by the receive circuit during a phase in which the latter is active, causes it to be held in the active state for at least part of the duration for which said information is transmitted.

2 Claims, 5 Drawing Sheets

PRICING DISPLAY SYSTEM

This is a continuation of Ser. No. 08/092935 filed Jul. 19, 1993, now abandoned, which was a continuation of Ser. No. 07/655159 filed Feb. 14, 1991, now abandoned.

BACKGROUND OF THE INVENTION

1. Field of the invention

The present invention is generally concerned with the display of information, in particular the display of prices or the like in retail stores, or stock data and the like, and it is more particularly concerned with a new system comprising a plurality of remote controlled display modules (also known as electronic labels) which can display variable data.

2. Description of the prior art

A number of systems of this type are known in the prior art.

In most known installations the electronic labels are connected to a central control computer via a bus type link typically comprising a power supply wire for the electronic circuitry of the labels and one or more wires for transmission of data between the computer and the labels.

Because of the presence of the cables, these systems are inconvenient to use, costly and unreliable. Also, they greatly complicate altering the layout of the store, as it is then necessary to modify the routing of the cables to adapt them to the new layout.

There is known from the patent FR-A-2 604 315 a two-way radio system linking a central unit and individual display modules in which the metal shelving for the products on sale is used to achieve electromagnetic coupling between a transmit antenna and the individual modules carried by said shelving.

A solution of this kind has a number of limitations, however. All shelving must be made from metals or alloys able to provide the coupling. The transmit antenna must be arranged so that sections of it extend along the upper surface of each shelving unit, which is inconvenient. Changing the layout of the store again implies total reconstruction of the antenna.

Finally, and most importantly, the display modules of this known system necessarily comprise two separate antennas for receiving a carrier and information proper, which increases their complexity and their cost.

The present invention is directed to alleviating these drawbacks of the prior art by proposing an installation which is economic, reliable and extremely flexible in relation to changing the layout of the retailing surfaces.

SUMMARY OF THE INVENTION

In one aspect, the present invention consists in a system comprising a central unit and a plurality of display modules each adapted to show on a display information received from said central unit, for example for displaying prices in a store, wherein said central unit comprises transmission means including a current loop fed with a low-frequency signal modulated according to the information to be transmitted, the system comprises, associated with each display module or group of display modules, a receive circuit, a receive antenna coupled electromagnetically to said current loop and means for activating the receive circuit at predetermined periods for a limited duration, and each transmission of information by said central unit is preceded by the transmission of a reactivation signal which, when detected by said receive circuit during a phase in which the latter is active, causes it to be held in the active state for at least part of the duration for which said information is transmitted.

In a second aspect, the present invention consists in a module for displaying information, for example the price of an article on sale in a store, comprising:

a central processor unit and an associated memory;

a display screen; and a receive circuit comprising a receive antenna for receiving pricing or like information to be displayed, said central unit being designed to activate said receive circuit at specific periods and for a limited duration and to hold said circuit active for a specific duration when a reactivation signal is detected by said receive circuit during an activation phase.

In a third aspect, the present invention consists in a portable terminal, for example for transferring information to a module for displaying said information, for example for displaying selling prices in a store, comprising:

a central processor unit and an associated memory;

data entry means comprising a keypad and an optical bar code reader;

a display screen for checking said information; and an information transmission circuit comprising means for modulating a low-frequency signal and for applying it to a current loop;

the terminal being further designed to transmit a reactivation signal adapted to activate a receive circuit of a module when said current loop is within a predetermined distance of said module.

Other aspects, aims and advantages of the present invention will emerge more clearly from the following detailed description of one preferred embodiment of the invention given by way of non-limiting example with reference to the appended diagrammatic drawings.

DETAILED DESCRIPTION OF THE INVENTION

Identical or similar units or parts in different figures carry the same reference numbers.

Figure 1:
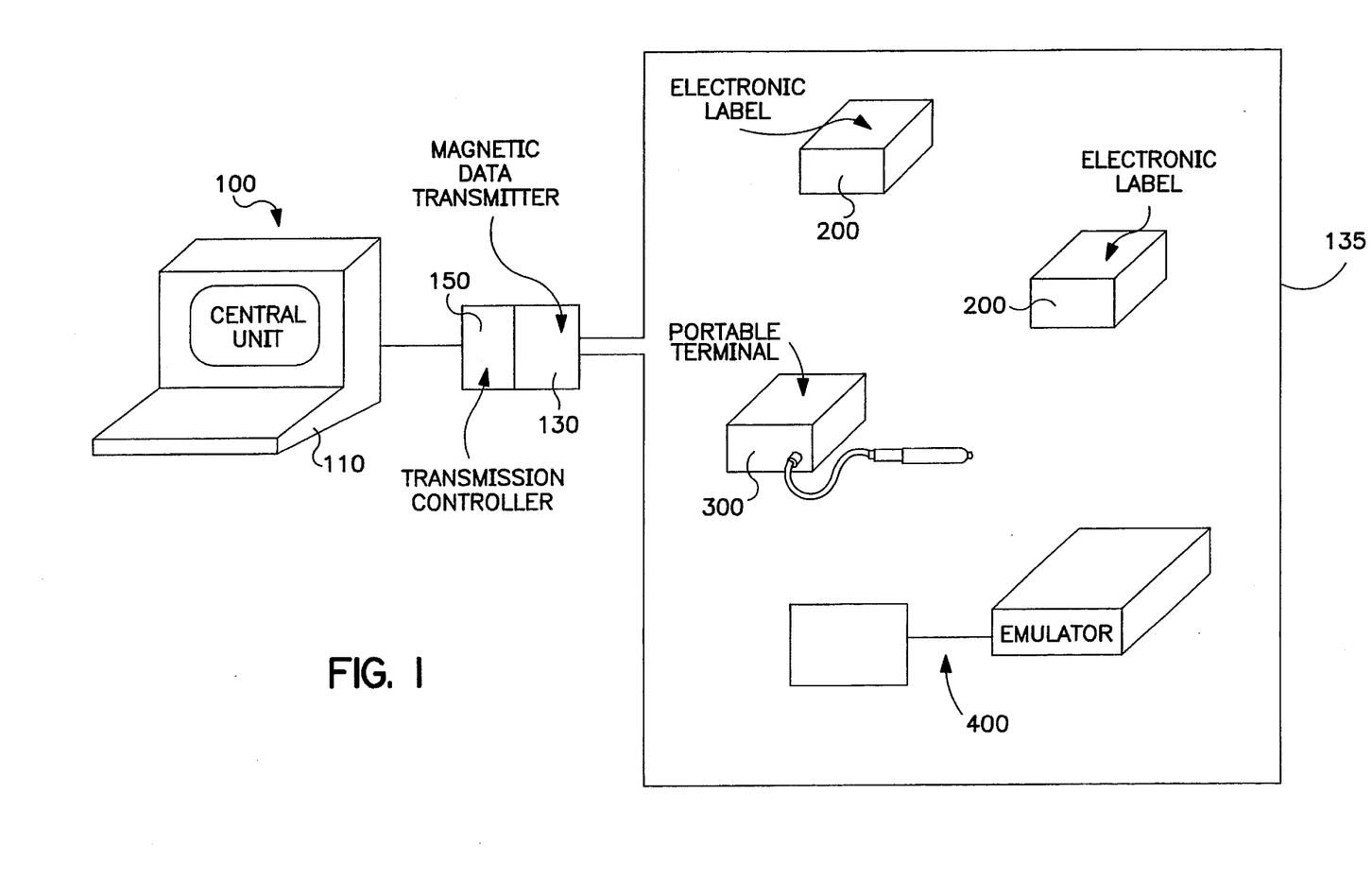
FIG. 1 is a schematic overview of a system of display modules in accordance with the present invention.

FIG. 1 shows a system designed to be installed in a supermarket selling foodstuffs, for example. It includes a central unit 100 comprising a computer 110, a device 130 for transmitting data magnetically using an induction loop 135 and a transmission controller 150 between the computer and the data transmitter 130.

The loop 135 is either a single loop, as shown, or a set of loops and covers all of the area likely to contain devices to which the transmitted data is addressed, which devices will be described in more detail later.

These devices are individual display modules also known as electronic labels 200 including a receive circuit adapted to receive the data transmitted by the central unit and, more generally, to be parametered to show on a display (a liquid crystal display, for example) specific and modifiable price data in respect of associated products. The number of labels 200 is obviously chosen to suit the number of product lines and may be as high as several thousand, for example.

The system further comprises one or more portable terminals 300 which can be used to read bar codes on products and to communicate with the labels individually to parameter them, in particular by feeding to them identification and price data.

Finally, the system may optionally include an emulator 400 adapted to receive data sent by the central unit and/or by a portable terminal and to supply information on the operation of the various data exchange means, for testing and diagnosing the system.

As will be described in more detail later, the two main functions of the system are as follows: firstly, to "initialize" each electronic label 200 by means of a portable terminal 300, this function entailing the entry into the battery backed-up memory of each label of its identifier, preferably obtained directly by reading the product bar code, together with price data if necessary; secondly, to enable instantaneous updating of the price data displayed by the labels, under the control of the central unit 100 and via the magnetic induction transmit/receive means.

The various component parts of the system will now be described.

Central unit

The central unit 100 essentially comprises a computer 110, a fixed data transmitter 130 and a transmission controller 150.

The computer may be any conventional type computer and will not be described in detail.

It typically holds in its memory data relating to each product line, for example identified directly by its own code (the bar code on the product itself), this data comprising, for example, price per item, price per unit weight or volume, remaining stock, etc.

Figure 2:
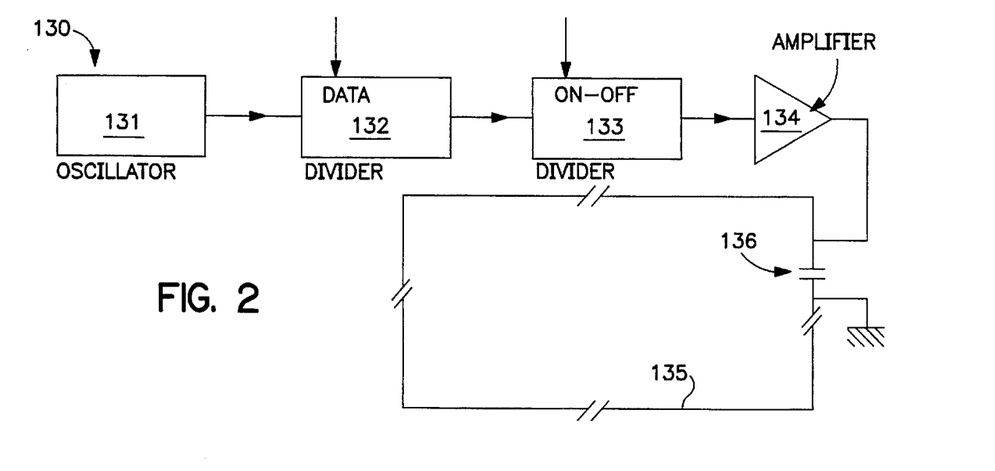
FIG. 2 is a block diagram of a first subsystem of a first part of the system.

Data for modifying the information displayed by the labels is advantageously transmitted from the central unit by radiation at very low frequency, the transmitter comprising an induction loop 135 tuned to the transmit frequency by a capacitor 136 (FIG. 2).

This means that the information is essentially transmitted in the form of a variable magnetic field, by magnetic coupling between the transmit loop 135 which covers all of the store and receive loops provided in the respective electronic modules.

This solution has numerous advantages:
 the transmitted wave tends to remain within the loop;
 the proximity of any metal object has little effect on the field received by the labels;
 deliberate disruption or scrambling of the transmission requires high power devices; and
 as the frequency is low, the power consumption and the unit cost of the receivers are low.

The operating frequency is advantageously between about 10 kHz and about 150 kHz, preferably in the order of 30 to 50 kHz and advantageously between 35 and 45 kHz. These frequencies are compatible with the data rate required for the central unit/electronic label link.

The signals are advantageously transmitted by frequency shift keying (FSK). Referring to FIG. 2, this FSK modulation can be effected by dividing down the output frequency of a quartz crystal oscillator 131 using a variable divider 132. As shown, the divider 132 may be followed by a fixed divider 133 whose output drives the current loop 135 through a low-frequency amplifier 134 of appropriate power rating incorporating an active bandpass filter. The current loop 135 is associated with a tuning capacitor 136 and forms a transmit antenna.

If the output signal from the divider 133 is an ideal squarewave, filtering is significantly simplified as this signal does not contain any even harmonics.

A quartz crystal oscillator operating at a frequency in the order of 3 to 3.5 MHz may be used, for example, the divider 132 dividing the output frequency of the quartz crystal oscillator by 10 or 11, depending on the logic level of the signal to be transmitted applied to its DATA input, the divider 133 dividing by eight. The high and low frequencies of the FSK modulated signal transmitted are therefore situated to either side of a central frequency between about 35.7 and 41.6 kHz, depending on the exact frequency of the quartz crystal oscillator 131.

The variable divider 132 is preferably a counter which is preset to count down from one or other of the two divider values, according to the logic level present at the DATA input.

The second divider 133 advantageously comprises an ON/OFF input which can be used to stop transmission without it being necessary to operate on the high-power signals on the output side of the amplifier 134.

Figure 3:
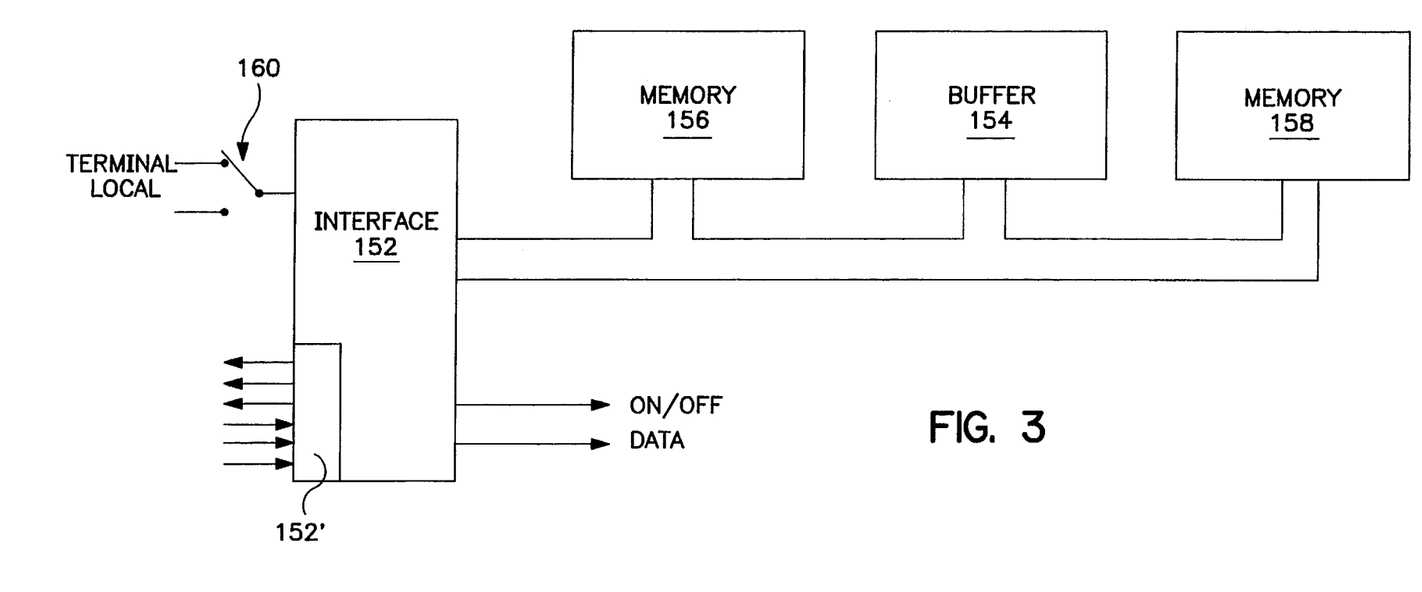
FIG. 3 is a block diagram of a second subsystem of said first part.

The transmitter described above is controlled by a transmission controller 150 associated with the computer 110.

Referring to FIG. 3, the transmission controller preferably comprises a microprocessor (MPU) 152 which receives data from the computer 110 and sends this data to the data transmitter 130 (DATA and ON/OFF lines).

The essential role of the transmission controller is to receive from the computer 110 data to be transmitted in a predefined format (according to the V.24 standard, for example), via an interface 152' (of the RS232C type, for example), to store this data in a buffer 154 and to apply this data to the data transmitter 130 according to a specific protocol which is described later. The program managing the operation of the transmission controller 150 is stored in another memory 156 and a further memory 158 contains automatic test sequences. A switch 160 may be provided for selecting a "terminal" mode in which the transmission controller executes instructions received from the computer 110 via the RS232C line or a "local" mode in which the transmission controller operates off-line from the computer to run the previously mentioned automatic test sequences.

Label

Figure 4:
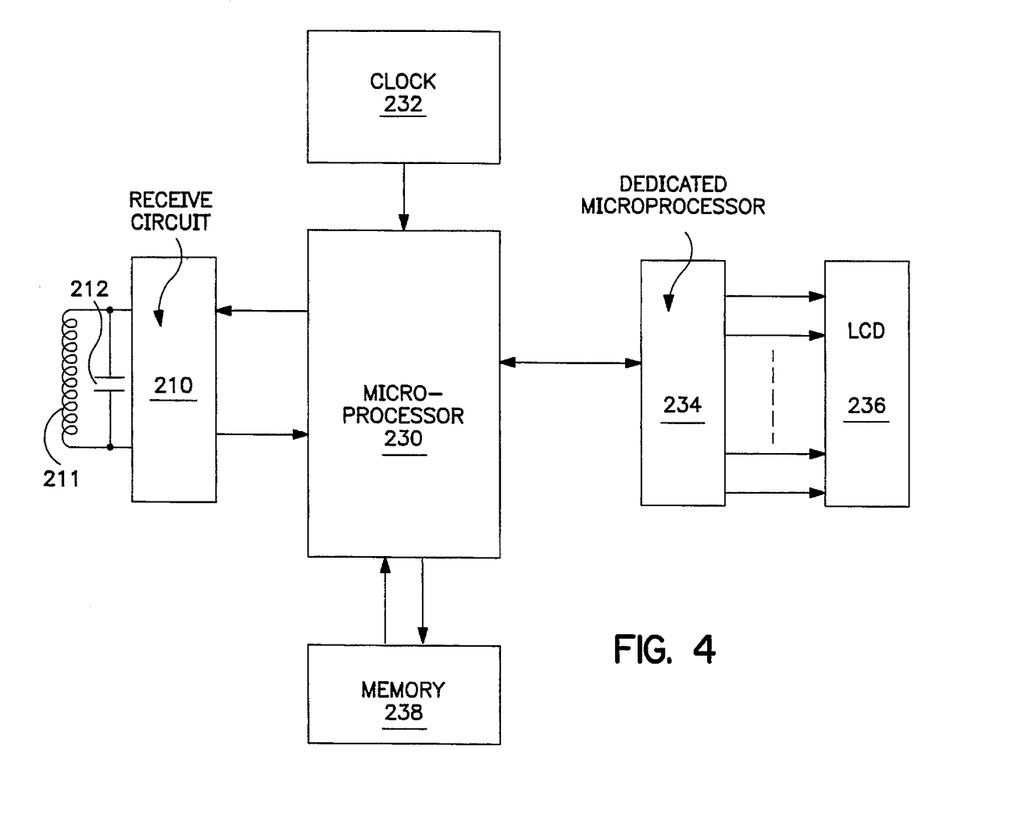
FIG. 4 is a general block diagram of a second part of the system.
Figures 5, 8:
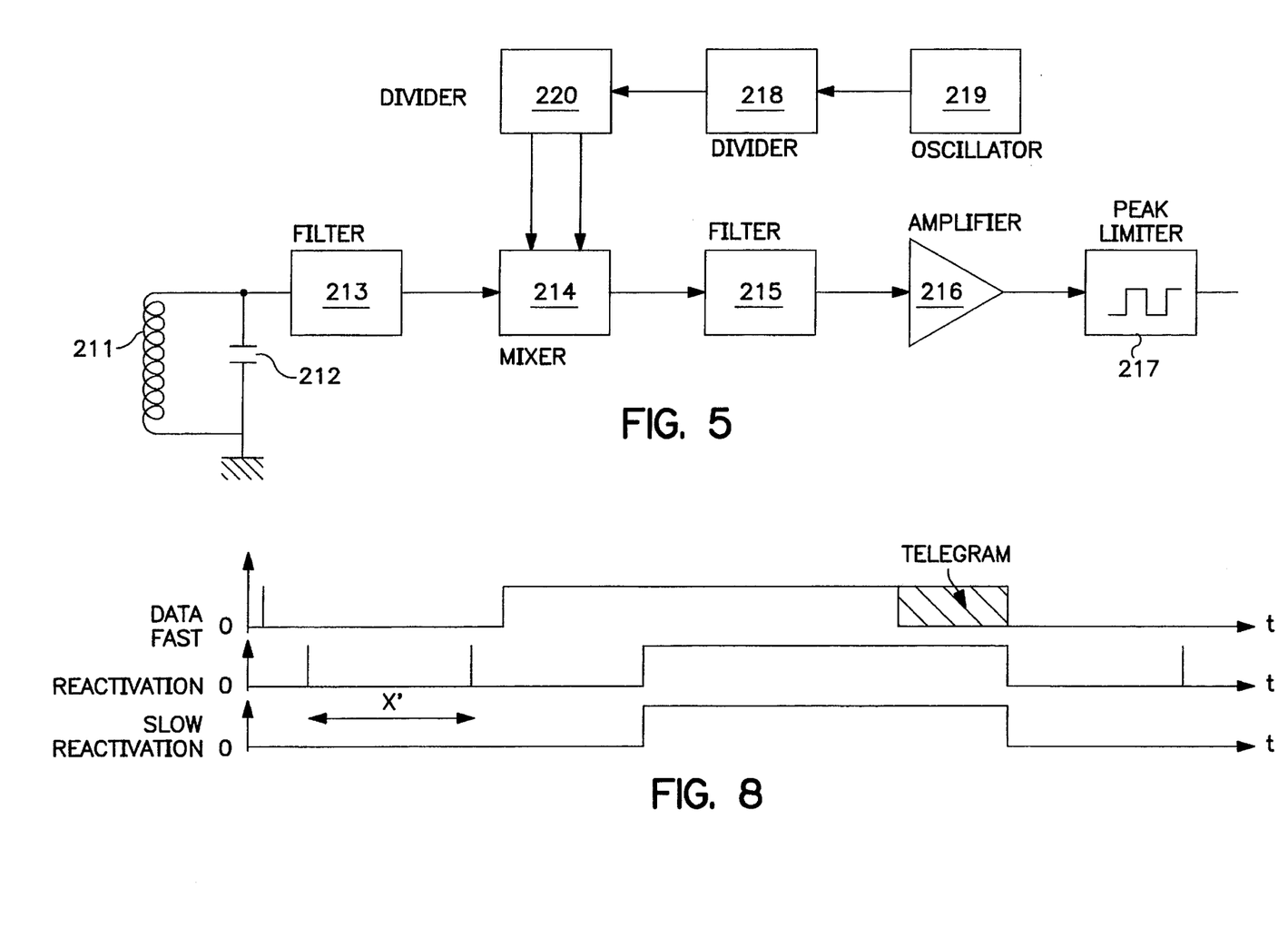
FIG. 5 is a block diagram of a subsystem of said second part.
FIG. 8 is a timing diagram showing the operation of the installation.

Referring to FIGS. 4 and 5, each electronic label 200 includes a receive circuit 210 incorporating a frame antenna 211 tuned by a capacitor 212 to the above-mentioned transmission frequency. The frame antenna is connected to a band-pass filter 213 whose output drives a switching mode mixer 214.

This drives a filter 215 driving a high-gain amplifier 216 in an open loop configuration; a feedback circuit comprising two oppositely connected diodes may be provided to prevent saturation.

The amplifier 216 drives a peak limiter amplifier 217 which amplifies the signals to a level compatible with the logic circuits on its output side.

The local oscillator frequencies are obtained by dividing by four a frequency equal to four times the receive frequency, which is in turn obtained by successive division (divider 218) of a reference frequency supplied by a quartz crystal oscillator 219 operating at approximately 5 MHz, for example. The divider by four 220 could, for example, comprise two type "D" flip-flops looped to deliver two signals in phase quadrature. These two signals are fed to the mixer 214.

An alternative form of receiver for the electronic label is a phase-locked loop (PLL) based on a Raytheon XR-2211 integrated circuit, for example.

Referring to FIG. 4, the electronic label 200 further comprises a microprocessor (MPU) 230 and its clock 232. The MPU 230 drives a liquid crystal display (LCD) 236 through a dedicated microprocessor (MPU) 234. The display 236 preferably comprises a first area for displaying the price per item with which the label is associated and a second, preferably smaller, area for displaying the price per unit weight or volume, etc.

The microprocessor 230 is preferably chosen to have the following specifications:

low power consumption, low cost, cycle time suited to the data transmission rate, which is in the order of 600 bauds, for example, and a sufficient high number (for example, approximately six) of input/output connections in addition to the display control line.

As will be further explained later, the main functions of the electronic module are:

receiving a module identification code and storing it in battery backed-up random access memory (RAM) in the microprocessor;

receiving and recognizing pricing data intended for the module; and displaying said data.

These functions are implemented by a program held in a memory 238 associated with the microprocessor 230 and which can also memorize the received data.

The receive antenna 211 is designed to meet the following requirements:

it must be compact;

it must be a low cost unit;

it must be efficient.

This being the case, to maximize the received voltage the windings are given the maximum possible size within the limitations set by the housing of the display module.

To increase the receive voltage and/or to reduce the number of turns required, a ferrite core is preferably used with the highest possible relative permittivity.

Portable terminal

Figure 6:
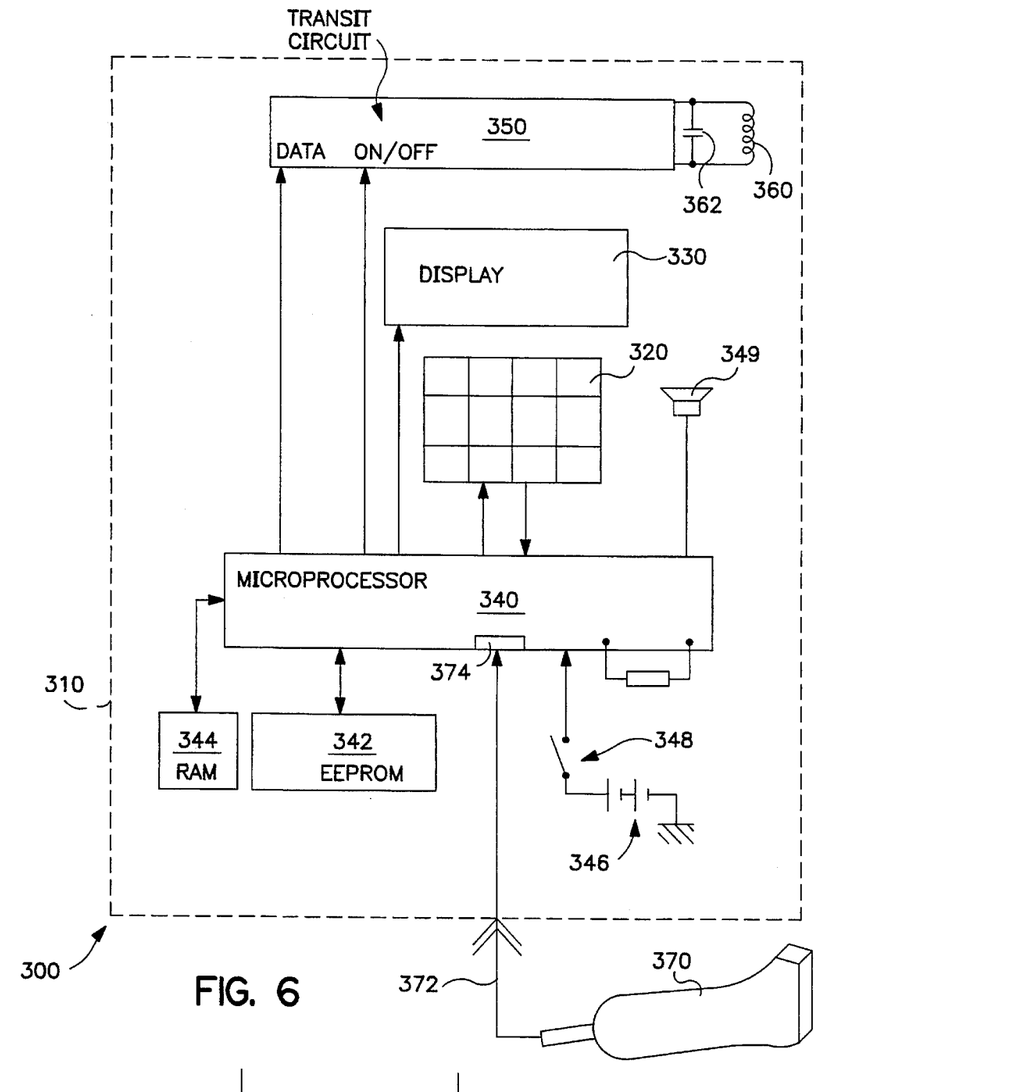
FIG. 6 is a block diagram of a third part of the system.
Figure 7:
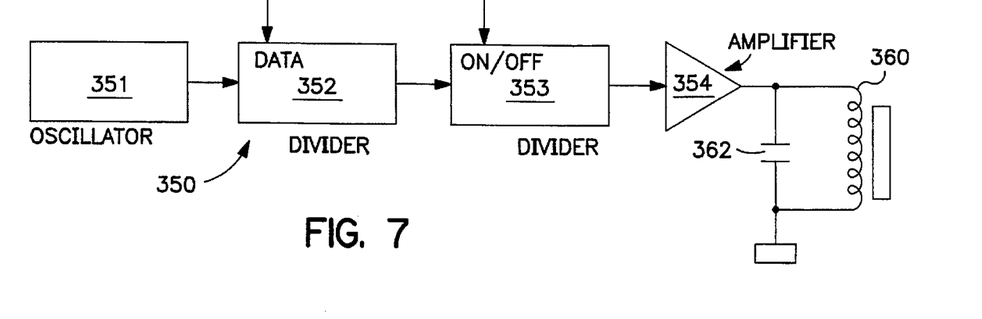
FIG. 7 is a block diagram of a subsystem of said third part.

Referring to FIGS. 6 and 7, the portable terminal 300 comprises a casing 310 accommodating a keypad 320 and an alphanumeric display 330, for example a liquid crystal display (LCD).

The keypad 320 comprises 16 keys, for example, namely ten number keys, a "decimal point" key, a "cancel" key and four function keys.

The display 330 comprises two lines each of 16 characters, for example.

A microprocessor (MPU) 340 is connected by appropriate input/output ports to the display 330 and to the keypad 320. It is also connected to a transmit circuit 350 incorporating appropriate modulation and amplification circuits and whose output is connected to a transmit winding 360 forming a current loop tuned by a capacitor 362. A read only memory (EEPROM, for example) 342 is connected to the microprocessor by appropriate buses and contains the program which controls the operation of the terminal and pre-programmed data. A random access memory (RAM) 344 is also provided to hold data to be sent to the labels (identification data and price data in particular). A power supply battery 346 is connected to the system through an ON/OFF switch 348. An audible warning device 349 (a buzzer, for example) is also provided, for reasons to be explained later.

Finally, a device 370 (a wand or light pen, for example) for reading bar codes by optical means is connected to the microprocessor 340 by a cable 372 and an appropriate interface 374.

The transmit circuit 350 will now be described with reference to FIG. 7.

It has to radiate a relatively low electromagnetic power because adjacent labels must not react to the initialization or modification of a particular label.

The modulation principle is, for example, the same as that used in the transmitter 130 associated with the central unit, namely dividing down the output frequency from a quartz crystal oscillator 351 using a variable divider 352. As shown, the divider 352 may be followed by a fixed divider 353 whose output drives the transmit frame antenna 360 with the associated tuning capacitor 362 via an amplifier 354.

A circuit of this kind is adapted to deliver the same frequencies as the circuit described with reference to FIG. 2 and has the same advantages.

The amplifier 354 is advantageously a common-emitter NPN transistor associated with a diode to prevent short-circuiting of the winding when the transistor is saturated.

Data is transferred from the portable terminal to a display module 200 by bringing the transmit antenna of the terminal near enough to the receive antenna of the module to achieve satisfactory magnetic coupling.

To give a concrete example, with a DC supply voltage of +6 V, sufficient power can be achieved to transfer data to a label approximately 5 cm from the portable terminal frame antenna.

The portable terminal 300 may optionally include means for storing all label initialization and modification operations, to be described below, in order to supply to the central computer over a wired or electromagnetic link a log of operations carried out.

By appropriately designing the program in its ROM 342, the terminal is able to offer the following functions which are listed in a main menu when the terminal is powered up:

display of the bar code already stored in the RAM of the portable terminal for verification;

manual entry of a numerical value equal to the price per kilo/price per item ratio or the price per litre/price per item ratio; this operation can be effected either by selectively calling up a value from a set of previously stored values or by entering the value on the keypad; in either case, the choice must be confirmed (validated) by pressing a specific function key on the keypad 320;

entry of the item price using the numeric keys and the "decimal point" key of the keypad 320, using the "cancel" key to correct any errors and confirming by pressing a specific function key;

programming the label, in other words loading data into the label; in this case a secondary menu provides a choice between the following four functions:

PROG enables programming in the label of its identifier (the read bar code) and the price per kilo (or litre)/price per item ratio;

PRICE enables programming of the item price; the price then appears on the display 236 of the label, together with the above-mentioned ratio if the PROG function has been executed first;

OFF enables the display 236 of the label to be turned off, to reduce its power consumption during periods of non-use; and ON enables the display to be turned on again.

Note that the bar code read and store function is not included in the main menu; this is because this function is implemented automatically; to go into more detail, as soon as the operator reads a bar code, an interrupt or like signal switches the microprocessor to a mode for receiving and storing said code, which is also displayed for verification. This procedure preferably also clears the price and price per kilo (or litre)/price per item ratio from the RAM 344 of the portable terminal.

Note that the PROG, PRICE, OFF and ON functions of the secondary menu can only be used after the operator has brought the portable terminal close enough to the label whose data is to be modified (to a distance of less than 20 cm, for example).

Data is transferred from the terminal to the label in two stages; in the first stage the label is reactivated, as will be described in more detail below, during which process said label shows on its display for a predetermined short period the message "LOADING LABEL"; the second stage is the data transfer stage, during which the above message is displayed continuously and the audible warning device 349 is activated.

At the end of the data transfer the portable terminal 300 is returned to its original state, in which the audible warning device is stopped and the main menu is displayed. The portable terminal can then be moved away from the label.

Label reactivation

Data is sent to each label by the central unit 100 or by a portable terminal 200 in asynchronous mode. It is therefore impossible for a label to know in advance the time at which a message (hereinafter called a "telegram") will be sent to it.

For reasons of electrical power consumption, however, it is not possible for the receiver of each display module to be constantly on standby.

An advantageous solution to this problem consists in "reactivating" the receiver of each module 200 periodically, for a predetermined time during which the receiver "listens out" for any messages addressed to its module. This periodic reactivation every X seconds for a time $t$ is achieved by the microprocessor 230 of the module 200 appropriately timing the putting into circuit and taking out of circuit of the receiver 210.

At the transmitter, to be more precise at the transmit controller 150, each sending of telegrams to display modules is preceded by a reactivation signal whose duration is at least equal to X seconds, to be sure that each receiver 210 detects the presence of the reactivation signal at least once. In this case the receiver 210 remains "active" for a given period enabling it to receive data from the central unit.

For maximum security the duration of the reactivation signal is chosen to be 2.X seconds.

The period X is merely chosen to be as long as possible; if $n$ is the average number of messages sent per hour to a given display module and if the above-mentioned time $t$ is 0.1 second, it can be shown that the optimum period X for minimizing power consumption by the receiver 210 is in the order of $\sqrt{(240/n)}$.

In a first implementation of this feature, to further minimize the time for which the receiver 210 is "active", each reactivation signal sent by the central unit incorporates countdown messages, i.e. digital data indicating the remaining time before the telegram data arrives.

For example, the 2.X seconds reactivation signal may incorporate eight countdown messages, digitally coded on three or four bits, for example, and regularly spaced within the reactivation signal at intervals of 2.X/9 seconds.

When the receive circuit of a label is activated, it can therefore determine from the current countdown value received the time to run before the data will arrive. The receive circuit can therefore be deactivated until this time. This further minimizes the time for which the receive circuit is active and increases the service life of the battery.

Using the above values, it can be shown that the power consumption of the receiver is minimized if the value of X is approximately $\sqrt{(6\ 480/n)}$.

It can also be shown that if X is more than ten the overall consumption achieved is equal to or less than 1/10th the overall consumption with no countdown.

In practise, assuming a store with 15 000 product lines and therefore 15 000 display modules, the values displayed on which must be updated every night, and assuming also that the central unit sends out during a night 150 telegrams each containing data for 100 display modules, and that the same transmission must be repeated three times to ensure correct reception, it can be shown that the optimum period X is approximately 37 seconds.

In this case the reactivation signals sent by the central unit previous to sending any data have a duration of 74 seconds and are punctuated every 8.2 seconds by a countdown message.

Of course, the above data must not be regarded as limiting on the invention.

Although the duration indicated above raises no problems for transmission of information transparently to users of the system, that is to say between the central unit and the modules, it is excessive for transmission of information from a portable terminal 300 to a display module 200, i.e. for programming or initializing the display module.

Means for accelerated reactivation of each module are therefore provided.

In this case, the receive circuit 210 of each label is provided with a circuit for detecting a nearby transmitter, for example a threshold circuit which receives the processed voltage from the receive antenna and which alerts the microprocessor.

The main criterion is the access time and the portable terminal can be designed to transmit a faster reactivation signal with a duration of two seconds, for example. In concrete terms, the microprocessor 230 is designed in this case to activate the detection circuit with a specific period X' and to "activate" the receiver 210 when it detects the transmission of a fast reactivation signal by the portable terminal. In practise the period X' may be approximately 800 ms.

As will be explained later, this fast reactivation function, which increases the power consumption of the display module circuitry, can advantageously be inhibited automatically (for example overnight and on days when the store is shut) from the central unit 100. Alternatively, the fast reactivation function can be inhibited permanently, in which case access to the display module concerned from the portable terminal is possible only after the central computer has been specifically asked to cancel this inhibition.

Transmission protocol

Messages are of various types:

a) Module programming messages, including module initialization, of course.

b) Data messages.

Each telegram sent by the data transmitter 130 preferably comprises a set of data messages and each message preferably comprises an address field and a data field. The address field is typically the identifier of a display module, for instance as embodied in the bar code on the associated product. The data field typically comprises a price per item or a price per unit weight or volume.

c) Characterization messages.

To avoid the receiver 210 of each display module remaining active throughout the duration of a telegram, which may be relatively long, provision is made for including before the body of a telegram a "characterizing" message comprising, for example, the first N digits of the identifiers of the modules to which the telegram relates. Thus the reactivation of a specific module is immediately followed by a stage in which these N digits are stored and compared with the first N digits of the identifier of the module concerned. If they are not the same, then the microprocessor 230 deactivates the module pending the next reactivation, to minimize its power consumption.

Also, one or more other characterizing messages may be sent in the same telegram, each characterizing a sub-family of the messages characterized at the start of the telegram.

d) Countdown messages, as described above.

e) Inhibiting messages.

The essential aim of these messages is to minimize the power consumption of the labels. They include:

messages for inhibiting fast reactivation, as explained above;

messages for turning off and on the liquid crystal display of the module (using the OFF and ON instructions mentioned above in the description of the portable terminal); and messages for deactivating modulest enabling the slow periodic reactivation function to be inhibited for a specified period; to be more preciset on receiving this kind of message the microprocessor 230 can start counting down from a specified value and begin to listen out for any reactivation signals sent by the central unit only when the count reaches zero.

In principle, the inhibiting messages are addressed to all labels which are listening out. However, by using an appropriate characterizing message it is possible to select which labels are affected by a particular inhibition.

A header may be included in each message to represent which type of message it is, so that the system can distinguish between different type messages.

Each message preferably comprises a number of words each coded on four bits, for example, and accompanied by three error detection bits (Hamming code or the like), these bits lying between a start of word bit and three end of word bits. The transmission rate may be in the order of 600 bauds, and the period is preferably a multiple of the clock period of the microprocessor 230.

The address of a display module is defined by the address of the store, coded on three words, for example, and the above-mentioned identifier (read bar code), coded on 13 words, for example. Using a specific address for each store avoids the possibility of interference between closely adjacent stores.

To prevent fraudulent misuse of the system some of the information transmitted can be scrambled, for example by logically combining certain words with a modifiable or fixed keyword, which can be loaded into each display module from the portable terminal during initialization.

To illustrate how the system in accordance with the present invention operates, FIG. 8 is a schematic timing diagram relating to the complete process of programming the module from the portable terminal, including the fast reactivation signal and a telegram (shaded area).

The protocol as described above is implemented by appropriately programming the transmission controller 150 which is part of the central unit 100, the microprocessor 340 controlling the operation of the portable terminal(s) 300, and the microprocessor 230 controlling the operation of each electronic label.

General description of operation

As explained above, a label 200 is initialized using the portable terminal 300 into which the bar code of the product with which the label is to be associated is read. The terminal is then interfaced to the label, as described above, to enter this data, which from this time onwards constitutes the identification code of the label, together with other data such as the unit price, price per kilo, etc.

The data displayed by the labels (essentially pricing data) is updated subsequently by transmitting data magnetically between the central unit and the labels or using the portable terminal.

Because of the arrangements described above concerning the transfer of information between the various parts of the system and because of the nature of the information that is transferred, the display modules can have a relatively long service life before their batteries need replacing.

Trials have been carried out under the following conditions:

liquid crystal displays of all display modules turned off overnight, from 22:00 through 09:00, and at weekends, from 21:00 on Saturday through 09:00 on Monday;

permanent inhibiting of the fast reactivation function, which is enabled only on a specific and individualized instruction from the central computer;

deactivation (including inhibition of slow reactivation) of all display modules from 21:00 on Saturday through 09:00 on Monday; and updating of the displays of 500 modules per day, using telegrams each relating to 20 modules, with irrelevant modules screened out by means of characterizing messages (up to 90% of modules can be excluded by this means), with each message sent three times.

These trials indicated an annual consumption in the order of 80 mA/h, so that each module can have a service life of several years using moderately sized batteries, and without using the magnetic coupling from the central unit to add top-up energy.

Of course, the present invention is not limited to the embodiment described above and shown in the drawings, and those skilled in the art will know how to introduce variations and modifications within the scope of the invention.

For example, it is not essential for each label to have its own receive circuit and the associated means, in particular the reactivation means. For example, a single receive circuit could be provided for a group of labels such as all the labels associated with a particular shelving unit.

Also, the system as described above could incorporate means for transmitting information from the labels to the central unit, either in each label or in a specific circuit associated with a group of labels.

As already explained, the present invention may be utilized to advantage for displaying selling prices in a store or to display stock data (remaining quantity, minimum quality, etc) in storage places in such a way that the data can be modified remotely. However, it will be clear that the invention can be used wherever any type of information to be modified remotely is to be displayed at a plurality of dispersed locations.

What is claimed is:

1. A system comprising a central unit and a plurality of display modules each adapted to show on a display device information received from said central unit, for displaying prices in a store, wherein said central unit comprises transmission means including a current loop fed with a low-frequency signal modulated according to display and control information to be transmitted, said transmission means for transmitting the modulated low-frequency signal to the display modules, and further comprising, in each display module, a battery, a reception circuit, a reception antenna electromagnetically coupled to said current loop and means for activating the reception circuit at predetermined periods and for a limited duration, wherein each transmission of information by said central unit is preceded by the transmission of a reactivation signal which, when detected by said reception circuit during a period of time in which said reception circuit is active, causes it to be held in the active state for at least part of the duration for which said information is transmitted, said system further comprising at least one portable terminal comprising means for generating initialization information to be transmitted to display modules and means for transmitting said initialization information by means of a second current loop fed with a low-frequency signal modulated according to said initialization information, said initialization information being transmitted to a display module by close electromagnetic coupling between said second current loop and said antenna of the display module, wherein the magnitude of the electromagnetic field received by a display module from said first loop is substantially lower than the magnitude of the electromagnetic field received from said second loop when said portable terminal is brought close to said display module, and each display module comprises field amplitude detection means for differentiating between remote transmission of display or control information from the central unit and proximity transmission of initialization information from said portable terminal; wherein said field amplitude detection means are activated at a second period shorter than said first activation period.

2. The system according to claim 1, wherein the information to be transmitted by the central unit comprises an instruction for remotely disabling the periodic activation of the field amplitude detection means of a selected group of display modules for a duration as determined by said instruction and corresponding to a period during which no information is intended to be received by said selected display modules from said portable terminal, whereby the life of the batteries of said selected display modules is extended.

* * * * *

UNITED STATES PATENT AND TRADEMARK OFFICE
CERTIFICATE OF CORRECTION

PATENT NO. : 5,504,475
DATED : April 2, 1996
INVENTOR(S) : Houdou et al.

It is certified that errors appear in the above-identified patent and that said Letters Patent is hereby corrected as shown below:

In column 9 at line 54 please delete " modulest " and insert -- modules --.

In column 9 at line 56 please delete " preciset " and insert -- precise --.

Signed and Sealed this

Twentieth Day of August, 1996

Attest:

BRUCE LEHMAN

*Attesting Officer*   *Commissioner of Patents and Trademarks*